United States Patent [19]

West et al.

[11] Patent Number: 4,878,273

[45] Date of Patent: Nov. 7, 1989

[54] METAL TRIM ATTACHING SYSTEM

[75] Inventors: Philip B. West, Detroit; Robert D. Major, Rochester Hills; Gary D. Fuerstenberg, Monroe, all of Mich.

[73] Assignee: Hoover Group, Aluminum Products Division, East Detroit, Mich.

[21] Appl. No.: 111,638

[22] Filed: Oct. 23, 1987

[51] Int. Cl.$^4$ .............................................. B32B 7/08
[52] U.S. Cl. ...................................... 24/289; 24/292; 24/297; 52/717.1
[58] Field of Search ................. 24/289, 290, 291, 292, 24/293, 294, 295, 296, 297, 304; 52/717.1, 716, 511; 428/31, 41

[56] References Cited

U.S. PATENT DOCUMENTS

| | | | |
|---|---|---|---|
| 2,303,864 | 12/1942 | Reasor | 52/717.1 |
| 3,543,465 | 12/1970 | Jackson | 52/716 |
| 3,606,433 | 9/1971 | Kunevicius | 428/31 X |
| 3,916,055 | 10/1975 | Wagner | 52/716 X |
| 4,066,285 | 1/1978 | Hall et al. | 52/716 X |
| 4,083,592 | 4/1978 | Rubin et al. | 52/716 |
| 4,246,303 | 1/1981 | Townsend | 52/716 X |
| 4,328,052 | 5/1982 | Watanabe | 52/717.1 X |
| 4,363,839 | 12/1982 | Watanabe et al. | 52/717.1 X |
| 4,546,022 | 10/1985 | Madonia et al. | 52/716 X |

*Primary Examiner*—Laurie K. Cranmer
*Attorney, Agent, or Firm*—Harness, Dickey & Pierce

[57] ABSTRACT

A metal trim attaching assembly secures an element, such as a molding strip, upon a supporting surface. The assembly includes an isolator that has a substantially flexible mounting plate with a mounting surface yieldable to conform generally to the contour of the supporting surface. Retaining flanges are formed integral with the mounting plate. The retaining flanges are grippable by the element to hold the element into a structural relationship with the mounting plate. Supporting flanges, also formed integral with the yieldable toward the mounting plate, provide supportable leverage for the element in cooperation with the retaining flanges. Double sided adhesive tape secures the mounting surface to the supporting surface. A method involves steps of stripping protective backing from the tape and securing it, with the isolator and trim, to the supporting surface.

23 Claims, 2 Drawing Sheets

METAL TRIM ATTACHING SYSTEM

FIELD OF THE INVENTION

The present invention relates to the art of attaching metal moldings to supporting surfaces, and more particularly, the present invention relates to assemblies for attaching and securing metal trim, such as molding strips on automobiles, to supporting surfaces. Still more particularly, the present invention relates to systems for attaching metal trim to automobiles without putting holes or weld studs in the body of the automobile.

BACKGROUND OF THE INVENTION

Automobile manufacturers have traditionally used stud members to attach metal trim work to the bodies of automobiles. The stud members have been telescopically associated with holes in the body of the automobile or the stud members have been welded to the body.

In the latter case, the metal to metal association of metal studs welded to metal panels promotes corrosion, especially under the road conditions of air and moisture to which all automobiles are subjected and, even more especially, under the conditions of air, moisture, and salt to which a significant number of automobiles are subjected.

In the former case, the corruption of the automobile body panel to provide the apertures for telescopically seating studs also promotes corrosion. When metal studs are associated with the metal surrounded body holes, the corrosion of the metal to metal condition takes place. Even when a metal body panel is treated against rust and corrosion, the studs wear against surrounding metal and eventually expose untreated metal which is unprotected against corrosion. In either case, metal trim bearing against a metal body part as the supporting structure prompts corrosive chemical reaction.

PRIOR ART

A solution to adverse effects traceable to use of studs to hold on molding has been suggested in U.S. Pat. No. 3,703,747 issued to Hamman on Nov. 28, 1972. Hamman teaches using a molding clip that may be adhesively secured to a supporting surface. The molding clip includes a plate section conforming substantially with the contour of the supporting surface and having laterally yieldable fingers which accommodate complementary flanges of a molding strip, attachable to the molding clip.

Nothing in the teaching of Hamman suggests that the molding clip is made of other than the traditionally used material of molding clips, that material being metal. The proximity of the metal, separated from the supporting surface only by the adhesive backing, again promotes corrosion between metal parts, and according to the drawings of the 3,703,747 patent, the trim molding is in actual contact with the supporting surface, promoting even more corrosion.

In addition to the Hamman clip's shortcomings in overcoming the corrosion problem, it should be noted that the clip must be precision machined to the particular contours of the work surface. Accordingly, some of the expense saved from not having to drill or weld to attach studs to the support surface is expended in engineering and applying the metal part at its exact location.

OBJECTS OF THE INVENTION

Accordingly, it is one object of the present invention to provide a method for inexpensively attaching and securing metal trim to a supporting surface without metal to metal contact.

It is another object of the present invention to provide an assembly for attaching and securing metal trim to supporting surfaces of different contours, without metal to metal contact.

It is yet another object of the present invention to provide an assembly for attaching and securing metal trim to a supporting surface without use of studs welded to or penetrating the supporting surface.

SUMMARY OF THE INVENTION

These and other objects are accomplished in the present invention by a novel metal trim attaching assembly for securing a trim element, such as a molding strip, upon a supporting surface having a contour. The trim is secured by means of a plastic isolator which has a generally symmetrical cross-section about a mid-axis that extends along its length.

The structure of the isolator includes a substantially flexible mounting plate that extends the length of the isolator. The flexible mounting plate has two inner facing edges and a mounting surface. The mounting surface is accordingly flexible to be yieldable to conform generally to the contour of the supporting surface.

Two retaining flanges are also included in the structure of the isolator. The retaining flanges are formed integral with the mounting plate and extend substantially the same length as does the mounting plate. Each retaining flange depends from the mounting plate proximate to a corresponding edge of the mounting plate. Each flange projects at an angle away from the mounting plate and toward the edge. The retaining flanges are grippable by the trim element to hold the trim element into a structural relationship with the mounting plate.

Two edge retainers or lips are also formed integral with the mounting plate. Each edge lip is disposed at a corresponding edge of the mounting plate and extends the length of it. Each edge lip depends from the mounting plate so as to restrict the element from moving substantially parallel to and toward the corresponding edge at which the lip is disposed.

Two yieldable support flanges or bull horn levers are also formed integral with the mounting plate and extend its length. Each lever projects away from the mounting plate to a free end that is resiliently movable toward the mounting plate as the lever flexibly bends toward the mounting plate. The free ends are adapted to press against the element to support the element and effect a supportable leverage in cooperation with the gripping flanges.

One or more adhesive strips are securable to the mounting surface and to the supporting surface, thereby to secure the isolator to the supporting surface.

Preferably, the isolator is made of a polyvinylchloride or other suitable plastic material because of its pliability and flexibility and because it is capable of isolating the metal trim from the metal supporting surface.

In the preferred method of using the assembly, the method also being an aspect of the invention, a first step involves cutting a length of double sided adhesive tape. Secondly, a protective backing is stripped from one side of the double sided adhesive tape. Thirdly, though not necessarily sequentially, the protective backing is stripped from the other side of the double sided adhesive tape. A fourth step, which may precede the third step, involves pressing one side of the double sided adhesive tape to the supporting surface. Fifth, the isolator is cut generally to the length of the adhesive tape. Sixth, a mounting surface of the isolator is pressed to the other side of the adhesive tape. Finally, the element is snapped over flanges of the isolator thereby attaching and securing the element to the isolator.

BRIEF DESCRIPTION OF THE DRAWINGS

A better understanding of the invention will be had by now referring to preferred embodiments thereof as illustrated in the accompanying drawings in which.

DESCRIPTION OF THE PREFERRED EMBODIMENTS

Figure 1:
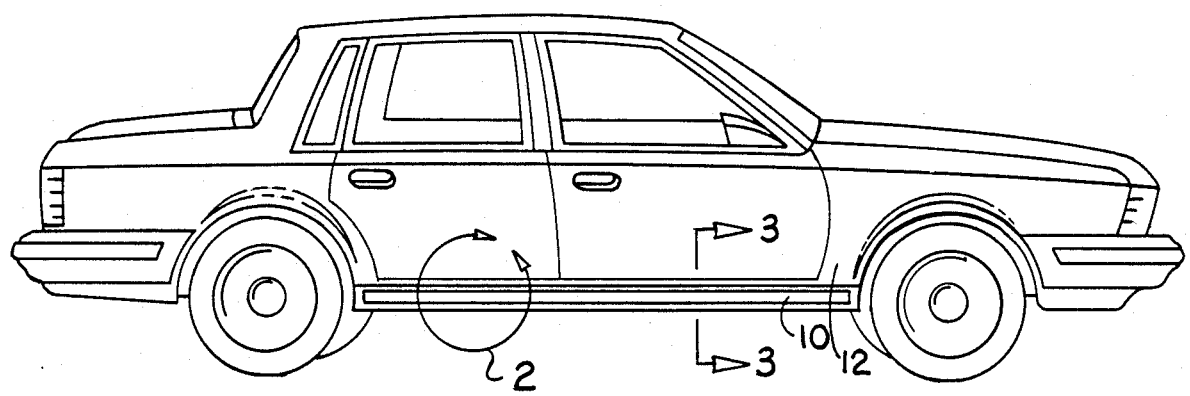
FIG. 1 is a side elevational view of an automobile incorporating one embodiment of a metal trim attaching assembly with the metal trim secured thereto in accordance with the present invention.

Referring now to the drawings more in detail, it is seen in FIG. 1 that a metal trim 10, which is a molding strip, is secured to a supporting surface 12, which in the particular example shown is the quarter panel of an automobile. The purpose of this view is to show the general location of the metal trim 10 in this one example; an attaching assembly, which secures the metal trim 10 to the supporting surface 12, is not shown in this view.

Figure 2:
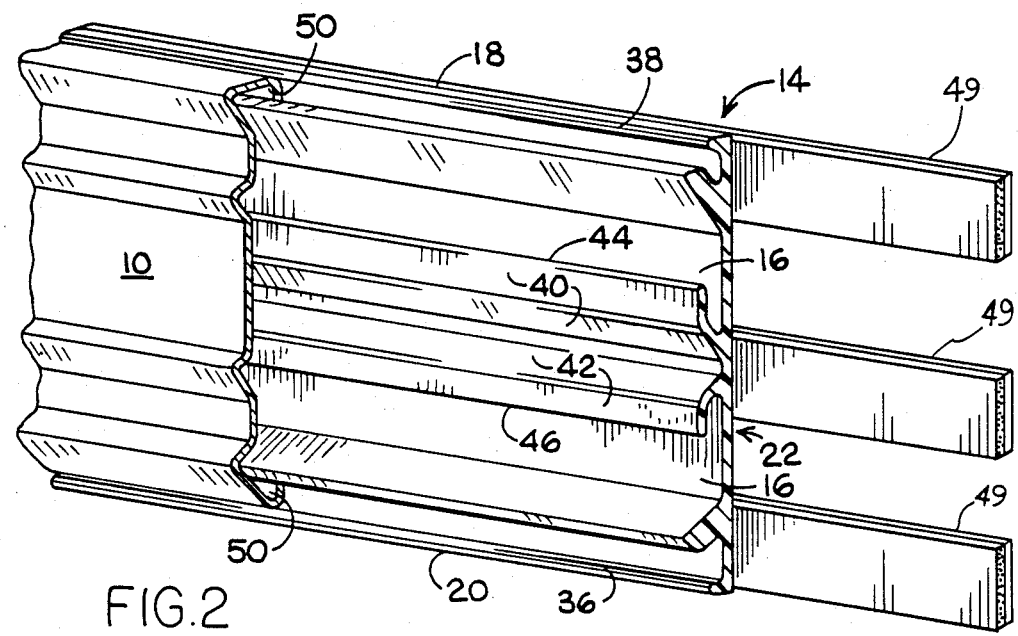
FIG. 2 is an enlarged partially cutaway perspective view of a portion of the trim shown in FIG. 1, generally the portion of the metal trim that is within circle 2, and the metal trim attaching assembly.
Figure 3:
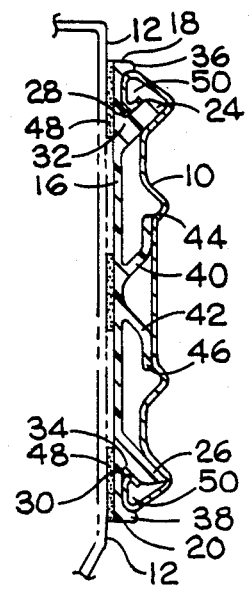
FIG. 3 is an enlarged sectional view of a metal trim attaching assembly and attached metal trim taken substantially along line 4—4 of FIG. 1.

Turning now to both FIGS. 2 and 3, a plastic isolator, indicated generally at 14, is longitudinally extending and has a generally symmetrical cross-section about a mid-axis that extends along its length. Preferably, the isolator is made of a material, such as polyvinylchloride, which is supple so as to have a flexibility limited most significantly only by the thickness of its cross section. The significance of this flexibility will become apparent as this disclosure unfolds. Such a material, or another suitable plastic material, operates to isolate the metal trim 10 from the metal supporting surface 12 to avoid corrosion at a joinder of the metal trim 10 and the metal supporting surface 12.

The structure of the isolator 14 includes a substantially flexible mounting plate 16 that extends the length of the isolator 14. The mounting plate 16 has two lateral edges 18 and 20 and a mounting surface 22. According to the flexibility of the mounting plate 16, the mounting surface 22 is also flexible, and so the mounting surface 22 is yieldable to conform generally to the contour of the supporting surface 12.

Still referring to FIGS. 2 and 3, two retaining flanges 24 and 26 are also included in the structure of the isolator 14. The retaining flanges 24 and 26 are formed integral with the mounting plate 16 and extend substantially the same length as does the mounting plate 16. Each retaining flange 24 and 26 is situated proximate to a corresponding edge 18 and 20, respectively, of the mounting plate 16, so that retaining flange 24 is proximate to edge 18 and retaining flange 26 is proximate to edge 26. Retaining flanges 24 and 26 project at an angle away from the mounting plate toward edges 18 and 20, respectively.

As can be seen in FIG. 3, the trim element 10 is so configured as to grip flange 24, as an in-turned, inner edge 28 of the trim 12 abuts a fixed base 32 of flange 24. As can also be seen, an in-turned, inner edge 30 of the trim 12 abuts a fixed base 34 of flange 26. Thus, the retaining flanges 24 and 26 are grippable by the trim element 10 to hold the trim element 10 into a structural relationship with the mounting plate 16.

Also formed integral with the mounting plate 16, still referring to FIGS. 2 and 3, an edge retainer or mounting plate edge lip 36 is associated with mounting plate edge 18. Associated with mounting plate edge 20 is an edge retainer or mounting plate edge lip 38. Both edge lips 36 and 38 extend the length of the mounting plate 16. The edge lips 36 and 38 depend from the mounting plate 16 so as to restrict the trim element 10 from moving substantially parallel to and toward the corresponding edge 18 or 20.

A pair of yieldable support flanges or bull horn levers 40 and 42 is also formed integral with the mounting plate 16 and extends its length. Bull horn lever 40 projects away from the mounting plate 16 to a free end 44 that is resiliently movable toward the mounting plate 16 as the flexible bull horn lever bends yieldably toward the mounting plate 16. Bull horn lever 42 projects away from the mounting plate 16 to a free end 46 that is also resiliently movable toward the mounting plate 16. The free ends 44 and 46 are adapted to press against the trim element 10 to support the element 10 and effect a supportable leverage in cooperation with the retaining flanges 24 and 26.

Three adhesive tape strips 48 are securable to the mounting surface 22 of the mounting plate 16. Preferably, the adhesive tape strips 48 are the double sided adhesive tapes with peelable protective backing 49 over each adhesive side, so that a length may be cut, the backing 49 may be peeled off of one side, the strip may be applied to a supporting surface, and the backing 49 peeled off the other side. The latter side receives the isolator 14 as the mounting surface 22 is pressed against the adhesive tape strip 48, securing the isolator to the supporting surface 12 to which the former side is adhesively attached.

Thus, as the metal trim 10 in FIGS. 2 and 3 has two crosswise inturned inner edges 28 and 30 which confront one another, the assembly for attaching a length of metal trim 10 to a supporting surface 12 includes the isolator 14 as a first means for isolating the metal trim 10 from the supporting surface 12. This first means 14 is flexible to be conformable generally to the contour of the supporting surface 12. It is also yieldable to be squeezable between the inner edges 28 and 30 of the metal trim 10 and resilient to be expandable within a hollow 50 of the metal trim 10 to hold the metal trim 10 in structural relationship with the first means and to support the metal trim 10 in spaced relation to the supporting surface 12.

The assembly also includes a second means, adhesive strips 48, for adhesively securing the first means 14 to the supporting surface and thereby securing the trim 10 in spaced relationship to the supporting surface.

Figure 4:
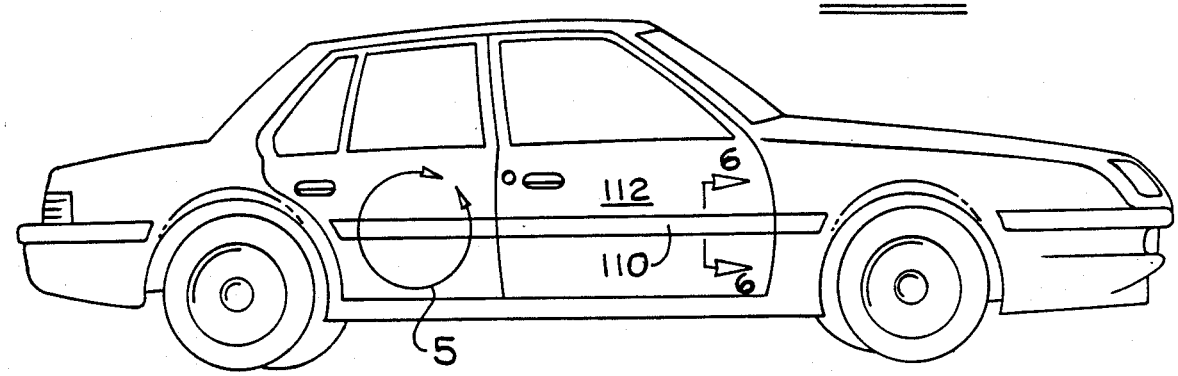
FIG. 4 is a side elevational view of an automobile incorporating another embodiment of the metal trim attaching assembly with the metal trim secured thereto in accordance with the present invention.

Referring now to FIG. 4, another embodiment of the invention is shown as a metal trim 110 secured to a supporting surface 112, in the particular example shown as the door panels of an automobile. As with FIG. 1, the purpose of this view is to show the general location of the metal trim 110 of this example. Again, the attaching assembly, which secures the metal trim 110 to the supporting surface 112, is not shown.

Figure 5:
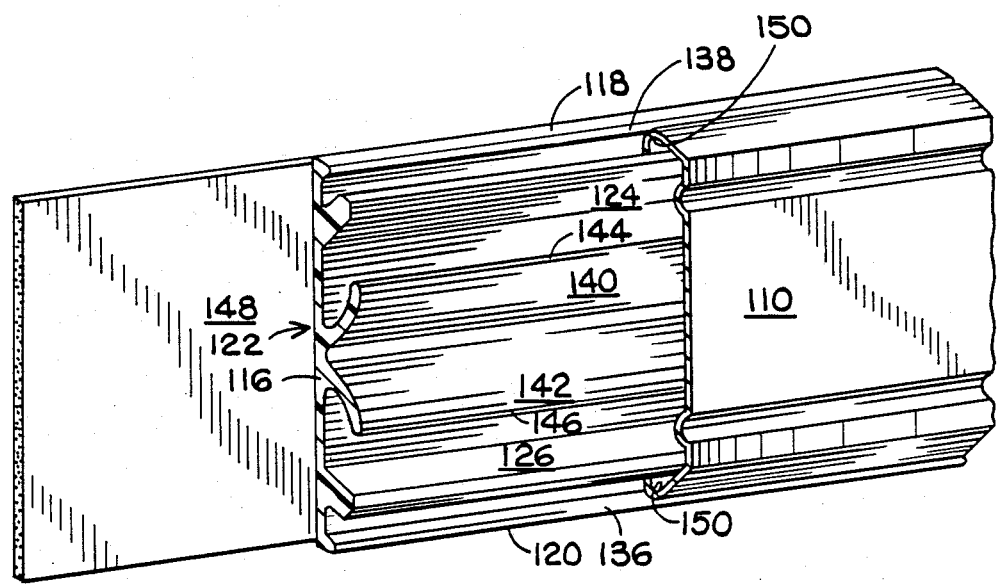
FIG. 5 is an enlarged partially cutaway perspective view of a portion of the trim shown in FIG. 3, generally the portion of the metal trim that is within circle 5, and the metal trim attaching assembly.
Figure 6:
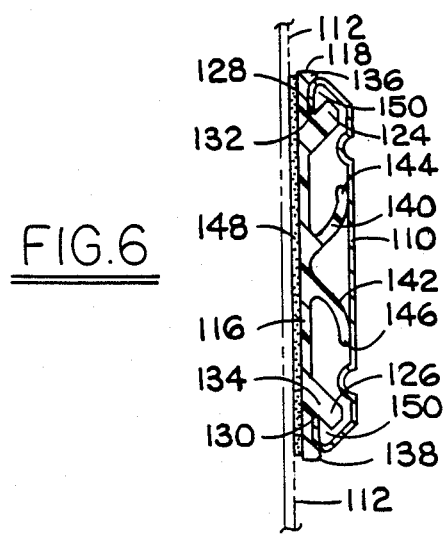
FIG. 6 is an enlarged sectional view of the metal trim attaching assembly and attached metal trim taken substantially along line 6—6 of FIG. 3.

Turning now to both FIGS. 5 and 6, another embodiment of the plastic isolator is indicated generally as at 114. Like the isolator 14 shown in FIGS. 2 and 3, isolator 114 is also generally symmetrical with regard to its cross-section, and is made of a material, such as polyvinylchloride, which is supple so as to have a flexibility limited only by the thickness of its cross section.

The structure of the isolator 114 is generally the same as the isolator 14 of FIGS. 2 and 3, and so includes a substantially flexible mounting plate 116 that extends the length of the isolator 114. The mounting plate 116 has two lateral edges 118 and 120 and a mounting surface 122. Two retaining flanges 124 and 126 formed integral with the mounting plate 116 are also included in the structure of the isolator 114. Each retaining flange 124, 126 depends from the mounting plate 116 proximate to a corresponding edge 118, 120 of the mounting plate 116, so that retaining flange 124 is proximate to edge 118 and retaining flange 126 is proximate to edge 120. Retaining flange 124 and 126 project away at an angle away from the mounting plate toward edges 118 and 120, respectively.

As can be seen in FIG. 6, the trim element 120 is so configured as to grip flange 124, as an inner edge 128 of the trim 112 abuts a fixed base 132 of flange 124. As can also be seen, an edge 130 of the trim 112 abuts a fixed base 134 of flange 126. Thus, the retaining flanges 124 and 126 are grippable by the trim element 110 to hold the trim element 110 into a structural relationship with the mounting plate 116.

All other elements of the structure of the isolator 114 are essentially the same as with the elements of the isolator 14 of FIGS. 2 and 3, including edge lips 136 and 138, corresponding edges 118 and 120, and yieldable support flanges or bull horn levers 140 and 142.

In the embodiment shown in FIGS. 5 and 6, one wide adhesive tape strip 148 is securable to the mounting surface 122 of the mounting plate 116. The adhesive tape strip 148 is again preferably the double sided adhesive tape with peelable protective backing over each adhesive side.

With reference to all of the figures, a preferred method of using the assembly is also an aspect of the invention. The method involves a series of steps which will now be disclosed not in a necessary order. A first step involves cutting a length of double sided adhesive tape 48 or tapes 148. Secondly, the protective backing is stripped from one side of the double sided adhesive tape 48 or tapes 148. Thirdly, though again not necessarily sequentially, the protective backing is stripped from the other side of double sided adhesive tape 48 or tapes 148. A fourth step, which particularly should be appreciated as possibly preceding the third step, involves pressing one side of the double sided adhesive tape 48 or tapes 148 to the supporting surface 12 or 112. Fifth, the length of an isolator 14 or 114 is cut to the length of the adhesive tape. Sixth, a mounting surface 22 or 122 of the isolator 14 or 114 is pressed to the other side of the adhesive tape 48 or 148. Finally, depending on the sequence of the other steps, the element 10 or 110 is snapped over all of the flanges 24, 26, 40 and 42 or 124, 126, 140 and 142 of the isolator 14 or 114, thereby attaching and securing the element 10 or 110 to the isolator 14 or 114.

It will be understood that various modifications may be made to the assembly and the method of using it without departing from the purview of the appended claims.

We claim:

1. A metal trim attaching assembly for securing a molding strip of metal, upon a supporting surface having a contour, the assembly comprising: a plastic isolator extending a length along which a mid-axis extends, the isolator being integrally formed and having a generally symmetrical cross-section about the mid-axis, the isolator including:

a substantially flexible mounting plate longitudinally extending said length and having lateral edges and a mounting surface, the mounting surface yieldable to conform generally to the contour of the supporting surface, two retaining flanges extending said length, each retaining flange depending from the mounting plate proximate to a corresponding edge of the mounting plate, each flange projecting at an acute angle away from the mounting plate and toward said corresponding edge, the retaining flanges being grippable by the metal strip to hold the strip into structural relationship with the mounting plate, two edge lips formed integral with the mounting plate, each edge lip disposed at a corresponding edge of the mounting plate and extending said length, each edge lip depending from the mounting plate so as to restrict the trim from moving substantially parallel to and toward said corresponding edge and said metal strip interlocked between respective flanges and edge lips, and a yieldable lever bracket formed integral with the mounting plate and extending said length of said mounting plate, said lever bracket having a cross-section with a central portion with a pair of angular arms extending therefrom and said cross-section being continuous the length of said mounting plate, said arms each projecting away from the mounting plate to a free end, the free ends resiliently movable toward the mounting plate as the lever yields toward the mounting plate, the free ends being adapted to press against the trim to support the trim and effect a supportable leverage; and adhesive means securable to said mounting surface and to the supporting surface for securing the isolator to the supporting surface.

2. The metal trim attaching assembly of claim 1 wherein the adhesive means is an adhesive strip securable to the mounting surface by adhesive attachment thereto securable to the supporting surface by adhesive attachment thereto.

3. The metal trim attaching assembly of claim 2 wherein the adhesive strip has pressure sensitive adhesive on opposing substantially flat sides of the adhesive strip.

4. The metal trim attaching assembly of claim 3 wherein removable protective backing is over the pressure sensitive adhesive.

5. The metal trim attaching assembly of claim 2 wherein the adhesive means is a plurality of double sided adhesive strips.

6. The metal trim attaching assembly of claim 5 wherein the each of the plurality of adhesive strips has pressure sensitive adhesive on opposing substantially flat sides of each adhesive strip.

7. The metal trim attaching assembly of claim 6 wherein removable protective backing is over the pressure sensitive adhesive.

8. The metal trim attaching assembly of claim 1 wherein the plastic isolator is made of polyvinylchloride.

9. A trim strip adapted to be secured to a supporting surface, comprising
   a substantially flexible longitudinally extending mounting plate having lateral edges, a top surface and a bottom mounting surface, said plate being integrally formed of a polymeric material and the mounting surface being yieldable to conform generally to the contour of the supporting surface for mounting thereon, a metal trim member securable to the top surface of said mounting plate
   a yieldable lever bracket formed integral with the mounting plate, said lever bracket having a cross-section with a central portion with a pair of angular arms extending therefrom and said cross-section being continuous the length of said mounting plate, each arm projecting away from the top surface of said mounting plate to a free end, the free ends being resiliently movable toward the mounting plate upon engagement with said trim member to effect a supporting leverage,
   engaging means, including an elongated hollow and two pairs of interlocking flanges each proximate one respective lateral edge, for securing said trim member to said mounting plate, one and the other flange from each flange pair extending, respectively, upwardly from the top surface of said mounting plate to define the hollow and downwardly from said trim member to interlock within its associated hollow, at least one flange of each said flange pair being at an acute angle to said mounting surface, and
   adhesive means securable to the mounting surface and to the supporting surface for securing the mounting plate to the supporting surface.

10. The trim strip as recited in claim 9 wherein said mounting plate is generally symmetrical about a central mid-axis, and the acutely angled flanges of each said flange pair extend from said trim member.

11. The trim strip as recited in claim 10 wherein said one flanges are retaining flanges and integrally formed with the mounting plate and each extends the length thereof to define the hollow for retaining the other flange, and each said acutely angled flange has a respective in-turned end portion disposed generally parallel to the top surface, the end portions being directed at one another and each received within its respective hollow.

12. The trim strip as recited in claim 11 wherein said mounting plate include two lips being integrally formed therewith, one at each corresponding edge of and extending the length of said plate, each lip confronting the hollow and restricting the acutely angled flanges from moving substantially parallel toward its corresponding edge.

13. The trim strip as recited in claim 11 wherein the retaining flanges are at an acute angle both to the mounting plate and its respective acutely angled flange, each said acutely angled flange having a first and second return portions projecting therefrom and which cooperate to squeezingly grip about an end of its respective retaining flange.

14. The trim strip as recited in claim 9 wherein the adhesive means is an adhesive strip securable to the mounting surface.

15. The trip strip as recited in claim 9 wherein the adhesive means is a plurality of double-backed adhesive strips.

16. A protective trim assembly securable upon a supporting surface having a contour, the assembly comprising:
   a metal trim member extending a length and having a generally symmetrical cross-section, the trim member including a generally planar body and a pair of in-turned flanges extending said length, each flange projecting at an angle away from the body,
   a mounting plate integrally formed of plastic extending said length and yieldable to conform generally to the contour of the supporting surface, the mounting plate being generally symmetrical in cross-section about a mid-axis and having lateral edges, a top surface and a mounting surface, the plate comprising two retaining flanges extending said length, each retaining flange depending from the top surface of the mounting plate proximate to a corresponding edge thereof and projecting at an angle away therefrom toward one respective edge, the retaining flanges being grippable by the in-turned flanges to hold the trim member into structural relationship with the mounting plate, and two edge lips extending said length, each lip depending from the mounting plate along a corresponding edge thereof so as to restrict the trim member from moving relative to said top surface in a direction substantially parallel to and toward said corresponding edge,
   a yieldable lever bracket formed integral with the mounting plate, said lever bracket having a cross-section with a central portion with a pair of angular arms extending therefrom and said cross-section being continuous the length of said mounting plate, each arm projecting away from the top surface of said mounting plate to a free end, the free ends being resiliently movable toward the mounting plate upon engagement with the trim member to effect a supporting leverage, and
   adhesive means securable to the mounting surface and to the supporting surface for securing the mounting plate to the supporting surface.

17. The protective trim assembly of claim 16 wherein the adhesive means is an adhesive strip securable to the mounting surface by adhesive attachment thereto securable to the supporting surface by adhesive attachment thereto.

18. The protective trim assembly of claim 17 wherein the adhesive strip has pressure sensitive adhesive on opposing substantially flat sides of the adhesive strip.

19. The protective metal trim assembly of claim 18 wherein removable protective backing is over the pressure-sensitive adhesive.

20. The protective metal trim assembly of claim 17 wherein the adhesive means is a plurality of double-sided adhesive strips.

21. The protective metal trimassembly of claim 20 wherein each of the plurality of adhesive strips has pressure sensitive adhesive on opposing substantially flat sides of each adhesive strip.

22. The protective trim assembly of claim 21 wherein removable protective backing is over the pressure-sensitive adhesive.

23. In combination, an assembly securable upon a supporting surface having a contour and comprising an isolator strip of non-metallic material securing a trim strip of metal, each said strip extending a length along which a mid-axis extends and having a generally symmetrical cross-section about its respective mid-axis, each said strip including a substantially flexible plate longitudinally extending said length and having lateral edges, said assembly including interengageable flanges and openings for releasably securing the trim strip to the isolator strip, the interengageable flanges comprising two retaining flanges each depending from the isolator plate proximate to a corresponding edge thereof and each projecting at an acute angle away from the isolator plate and toward said corresponding edge to define an opening sized to receive a corresponding retaining flange extending from the trip plate, a resilient lever formed integral with said isolator plate and engageable with the trim plate for providing supportable leverage between the plates, said lever having a cross-section with a central portion with a pair of angular arms extending therefrom and said cross-section being continuous the length of said flexible plate and adhesive means securable to the isolator strip for securing the isolator strip to the supporting surface.

* * * * *